S. PEARSON.
STOVE.
APPLICATION FILED APR. 13, 1920.

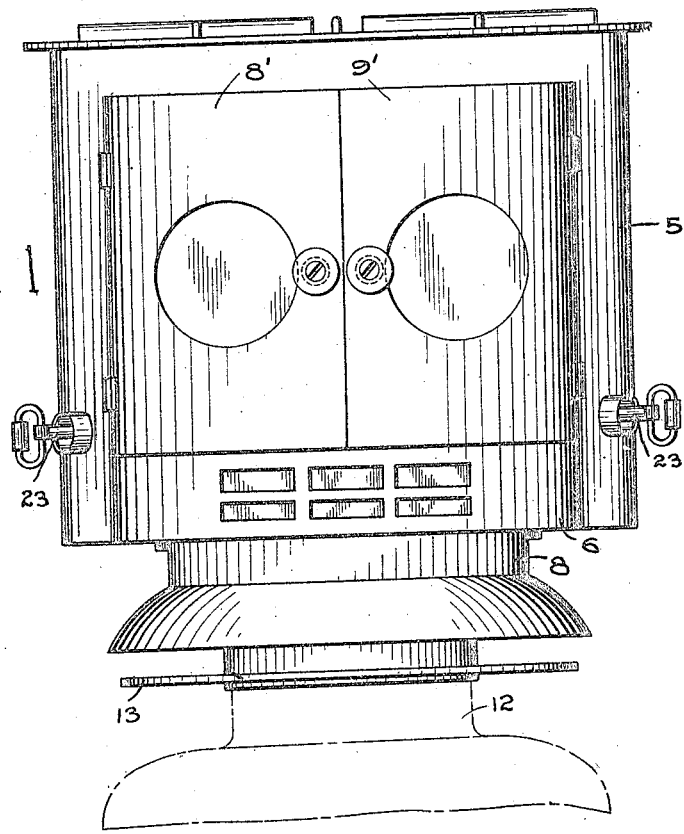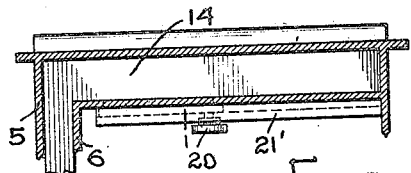

1,372,902.

Patented Mar. 29, 1921.
2 SHEETS—SHEET 2.

Inventor
SEVERIN PEARSON

Witness

By
Attorneys

UNITED STATES PATENT OFFICE.

SEVERIN PEARSON, OF BROOKLYN, NEW YORK.

STOVE.

1,372,902. Specification of Letters Patent. Patented Mar. 29, 1921.

Application filed April 13, 1920. Serial No. 373,526.

*To all whom it may concern:*

Be it known that I, SEVERIN PEARSON, a citizen of the United States, residing at Brooklyn, in the county of Kings and State of New York, have invented a new and useful Stove, of which the following is a specification.

This invention relates to stoves, and more particularly to cooking stoves of the type which burn liquid or gaseous fuel, it being the primary object of the invention to provide a device of this character wherein a stove may be employed simultaneously for heating a plurality of utensils supported thereon.

A further object of the invention is to provide means for controlling the heat of the stove, to cause the same to be confined to a single utensil, or distributed to heat a plurality of utensils, at the will of the operator.

A still further object of the invention is to provide a stove wherein the burner thereof, will not be affected by winds or air currents, thereby providing a stove which may be efficiently employed as an open air, or camp stove.

Another object of the invention is to provide means for permitting the heat and products of combustion to pass to a point remote from the burner proper, together with a protecting plate adapted to guard the burner proper against the heat of the stove, thereby removing any possibility of preheating the oil, on its passage to the burner, thus eliminating smoking of the burner.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a front elevational view of a stove constructed in accordance with the present invention.

Fig. 4 is a fragmental sectional view taken on line 4—4 of Fig. 2.

Figure 2:
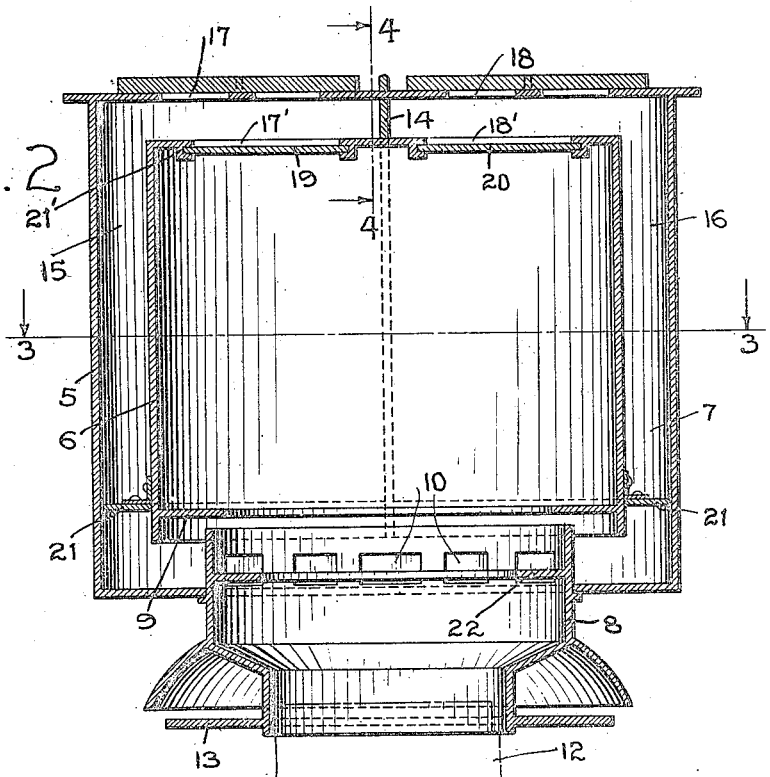
Fig. 2 is a longitudinal sectional view through the stove.
Figure 3:
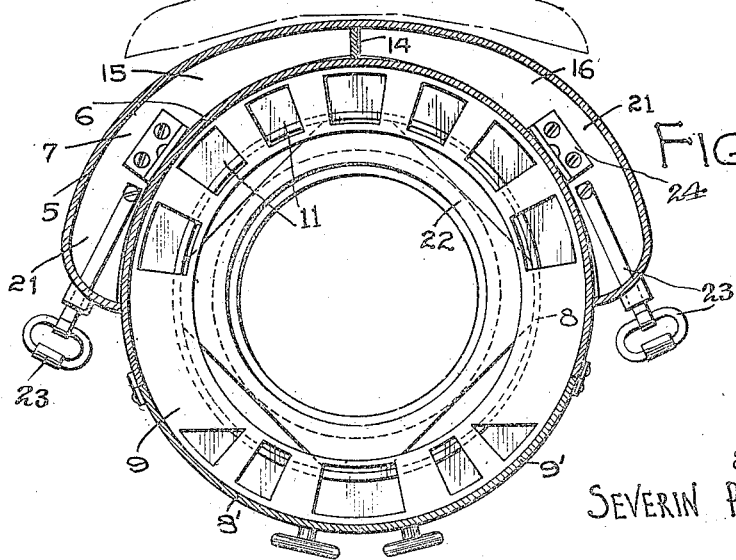
Fig. 3 is a sectional view taken on line 3—3 of Fig. 2.

Referring to the drawings in detail, the body of the stove includes an outer casing 5 and an inner casing 6, the outer casing being spaced from the inner casing to provide a compartment 7 to permit heat from the burner, to be hereinafter more fully described, to pass upward therethrough.

The casings forming the stove are preferably circular in cross section, the inner casing having a front opening to provide access to the interior thereof, to form a main cooking compartment, the hinged doors 8 and 9 being provided to close the main cooking department, or body portion of the stove, so that a utensil supported in the stove and within the confines of the inner casing, may be completely housed thereby, in a manner to insure the efficient heating of the same.

A circular opening is formed in the bottom of the outer casing 5, which opening accommodates the tubular supporting element 8, which is of a diameter to closely fit within the central opening in the bottom of the outer casing, the tubular supporting member being of a length to permit the upper end thereof to extend into the body of the stove, the upper extremity thereof being disposed in spaced relation with the flange 9, which is secured to the inner wall of the inner casing 6, thereby providing a passageway between the upper end of the tubular supporting member 8 and the flange, to permit the heat from the burner, employed in connection with the stove, to pass into the compartment 7.

In order to further insure the heat passing into the compartment 7, openings 10 are provided in the member 8, which openings are disposed in spaced relation with each other and provide communication between the compartment 7 and the interior of the member 8. Openings 11 are also provided in the flange 9, to permit the heat from the burner, when so desired, to pass upwardly into the main cooking compartment of the stove body, as heretofore described.

The lower portion of this tubular member 8, is substantially funnel-shaped to permit the device to be easily and readily positioned on the burner, indicated at 12, there being provided a circular flange 13, at the lower end of this funnel-shaped member, which flange acts as a guard to protect the burner 12 from the heat which would radiate from the stove, after the same has been lighted a predetermined period, thus insuring against preheating of the oil, and eliminating any possibility of the burner smoking.

A partition, indicated at 14 extends along the upper surface of the inner casing, and has connection with the outer casing, to divide the space between the outer and inner casing substantially centrally thereof, to provide passageways along the upper edge of the inner casing, and as shown, this partition extends downwardly at the rear of the stove, terminating at a point adjacent to the lower edge of the inner casing, thereby dividing the compartment 7 into a pair of flues 15 and 16, the flue 15 being for the purpose of supplying heat to the stove opening 17, while the flue 16 directs heat to the opening 18.

In order that the heat, which passes upwardly through the central casing, may also be directed to the openings 17 and 18, the slides or closures 19 and 20 are provided, to close the openings 17' and 18', formed in the inner casing. These closures operate in suitable guideways indicated at 21' formed in the inner casing so that the same may be moved to regulate the passage of heat from the stove.

Positioned in each of the flues 15 and 16 is a damper 21, connected to the casing 6 as by means of hinges 24, which dampers are curved to conform to the contour of the casings, so that when the dampers are moved to a position as indicated by Fig. 2 of the drawings, the lower portions of the compartments 15 and 16 will be closed off, thus directing the heat to the main cooking compartment, in the event that it is desirable to heat the contents of a receptacle supported within the main cooking compartment.

If it is found desirable to heat a receptacle in the lower compartment, and simultaneously heat receptacles positioned on the top of the stove or over the openings 17 and 18, the dampers 21 will be moved to permit the passage of heat through the flues 15 and 16, the closures 19 and 20 being also moved to permit the heat to pass upwardly through the openings which the same control.

It might be further stated that an inwardly extending flange 22 is provided in the member 8, at a point substantially intermediate the length thereof, which flange may be of any suitable construction, to support a relatively small receptacle thereon.

Operating handles 23 have connection with each of the dampers 21, and these operating handles extend through suitable openings provided in the outer casing, so that the dampers 21 may be readily and easily operated to control the passage of heat through the compartments of the stove.

While the burner which supplies the heat to the stove, has not been described in detail, it is to be understood that any suitable burner having means to admit a sufficient quantity of air to permit the stove to operate without smoking, may be employed.

It is believed that in view of the foregoing description, a further detail description as to the operation of the stove is unnecessary.

Having thus described the invention, what is claimed as new is:—

1. A cooking stove including an outer casing and an inner casing, the inner casing being spaced from the outer casing to provide a flue, a vertical partition disposed at the rear of the casings, and dividing the flue into compartments, a flange extending inwardly from the inner wall of the inner casing, hinged dampers disposed in the compartments at the bases thereof, for controlling the passage of heat through the flues, said flange having openings to permit heat to pass upwardly within the inner casing, and a tubular supporting element disposed under the flange, and said tubular supporting member having lateral openings.

2. A cooking stove comprising an outer casing and an inner casing, said casings being supported in spaced relation to provide a flue, a partition disposed in the flue at the rear of the stove to divide the flue into lateral flues, a tubular supporting member disposed under the inner casing, the inner casing having openings in the upper surface thereof to permit heat to pass upwardly therethrough, an inwardly extending flange disposed over the inner end of the tubular member and supported in spaced relation therewith to provide a passageway, and said tubular supporting member having lateral openings formed therein.

In testimony that I claim the foregoing as my own, I have hereto affixed my signature in the presence of two witnesses.

SEVERIN PEARSON.

Witnesses:
 IVY E. SIMPSON,
 J. R. PATTISON.